United States Patent [19]
Ranta

[11] Patent Number: 5,640,485
[45] Date of Patent: Jun. 17, 1997

[54] SPEECH RECOGNITION METHOD AND SYSTEM

[75] Inventor: Jukka Tapio Ranta, Salo, Finland

[73] Assignee: Nokia Mobile Phones Ltd., Salo, Finland

[21] Appl. No.: 417,727

[22] Filed: Apr. 6, 1995

Related U.S. Application Data

[63] Continuation of Ser. No. 72,145, Jun. 4, 1993, abandoned.

[30] Foreign Application Priority Data

Jun. 5, 1992 [FI] Finland .................. 922606

[51] Int. Cl.$^6$ .................. G10L 5/06; G10L 9/00
[52] U.S. Cl. .................. 395/2.6; 395/2.48; 395/2.49
[58] Field of Search .................. 381/42, 43; 395/2.4, 395/2.47, 2.48, 2.49, 2.6, 2.61, 2.65, 2.64

[56] References Cited

U.S. PATENT DOCUMENTS

| | | | |
|---|---|---|---|
| 4,509,133 | 4/1985 | Monbaron et al. | 364/513.5 |
| 4,783,803 | 11/1988 | Baker et al. | 381/42 |
| 4,837,831 | 6/1989 | Gillick et al. | 395/2.49 |
| 4,852,171 | 7/1989 | Jakatdar et al. | 395/2.49 |
| 4,876,720 | 10/1989 | Kaneko et al. | 395/2.49 |
| 4,905,287 | 2/1990 | Segawa | 395/2.49 |
| 5,091,947 | 2/1992 | Ariyoshi et al. | 381/42 |
| 5,212,764 | 5/1993 | Ariyoshi | 395/2 |

FOREIGN PATENT DOCUMENTS

| | | | |
|---|---|---|---|
| 0135046 | 3/1985 | European Pat. Off. | G10L 7/08 |
| 0200347 | 11/1986 | European Pat. Off. | G10L 5/06 |
| 0241183 | 10/1987 | European Pat. Off. | G10L 5/06 |
| 0477688A3 | 1/1992 | European Pat. Off. | G10L 3/00 |
| 922606 | 2/1993 | Finland . | |
| WO89/10612 | 11/1989 | WIPO | G10L 5/06 |

OTHER PUBLICATIONS

"Voice Recognition in Cellular Mobile Telephones", Thomas B. Schalk, Speech Technology, Sep./Oct. 1986, pp. 24–28.

"A voice Controlled Telephone Dialer", Selim S. Awad, David A. Wagner, and Michael M. Flaherty; IEEE Transactions on Instrumentation and Measurement, vo. 38, No. 1, Feb. 1989, pp. 119–125.

Primary Examiner—Allen R. MacDonald
Assistant Examiner—Richemond Dorvil
Attorney, Agent, or Firm—Perman & Green, LLP

[57] ABSTRACT

The present invention relates to a speech recognition method and a system for a speech-controllable telephone in which a value is computed (2) for a reference word with a speech recognizer (8) on the basis of a word uttered by a user, and a recognition resolution (6a, 6b) is made on the basis of said value. Prior to making said recognition resolution, it is found out (3) if repetition of a previous word is in question, and if so, a new value is computed (5) for the reference word on the basis of the value computed by the speech recognizer and of a value in the memory, computed earlier for the reference word, and a recognition resolution (6a, 6b) is made on the basis of said computed new value.

22 Claims, 1 Drawing Sheet

SPEECH RECOGNITION METHOD AND SYSTEM

This is a continuation of application Ser. No. 08/072,145 filed of Jun. 4, 1993, now abandoned.

BACKGROUND OF THE INVENTION

The present invention relates to a speech recognition method and system, in particular to a method and system for a voice-controllable telephone in which a value of a reference word is computed by a speech recognizer on the basis of a word uttered by a user, and a recognition resolution is made on the basis of that value.

BRIEF DESCRIPTION OF THE PRIOR ART

Telephones are usually provided with a handset which the user holds in his/her hands while speaking. This is also the case when radiophones such as mobile phones are used. Such a telephone leaves only one hand free, and thus can cause difficulties when driving. A solution to this problem is a separate microphone placed in the car and a separate loudspeaker to be controlled at an appropriate volume and located at an appropriate distance from the user so that the user is able to hear the other party clearly. Even with this design the user has to use one of his hands to make a call, i.e. in dialling the number of the other party or in responding to an incoming call, or in terminating a call.

For a telephone user to be able to concentrate on driving, so-called hands free telephones have been developed in which the operations can be voice controlled. Hereby, all of the telephone operations can be voice controlled, such as on/off switching, transmit/receive, speech volume control, phone number dialling, telephone call answering, and the user is thus able to concentrate on driving. The driver need not remove his hands from the steering wheel nor take his eyes from the road; therefore, the hands free-telephone considerably increases road safety.

A drawback involved in the voice-controlled phone is that speech recognition is not entirely perfect. The background noise caused by the vehicular environment is high and thus, speech recognition becomes more difficult. Some endeavours have been made to market the speech recognition ability in association with mobile phones, but because of the unreliability thereof the users' interest in voice-controlled phones has been insignificant. The recognition accuracy of speech recognizers known in the art is not very good, particularly in adverse conditions, e.g. in a moving vehicle where the high background noise substantially presents reliable word recognition. Incorrect recognition resolutions generally cause most of the inconveniences in implementing a user communications system because they might start undesirable operations, such as termination of calls in the middle thereof, which is particularly inconvenient from the user's point of view. The most common consequences of erroneous speech interpretations is dialling a wrong number. For this reason, user communications are designed so that a recognition resolution is not made by a speech recognizer at all if it has not achieved a sufficient ensurance of the word uttered by the user, and in such instances, the user is usually requested to repeat the command uttered.

Nearly all speech recognizers are based on the performance principle that a word uttered by a user is compared by a rather complicated method with reference words previously stored in the memory of the speech recognizer. Speech recognizers generally compute a number corresponding to each reference word and indicating to what extent the word uttered by the user resembles the reference word. Finally, a recognition resolution is made on the basis of the numbers so that the reference word which the uttered word most resembles is chosen for the resolution. One of the most well known methods in the comparison between the uttered word and the reference words is the Dynamic Time Warping (DTW) method and the statistical Midden Markow Model method (HMM).

In both the DTW and the HMM method an unfamiliar speech pattern is compared with the known reference patterns. In the Dynamic Time Warping, a speech pattern is divided into a number of frames and the local distance between the speech part in each frame and the speech part equivalent to the reference pattern is computed. On the basis of the local distances derived in this manner a minimum path is looked for between the initial and terminating point of the word by means of a DTW algorithm. Thus, with a Dynamic Time Warping a distance can be obtained between the uttered word and the reference words. In the method speech patterns are generated, and said speech pattern generation step is patterned with a status change pattern according to the Markov Method. Said status change pattern is thus HMM. Speech recognition for said received speech patterns now takes place by defining the observation probability for said speech patterns with the aid of the HMM pattern. Using the HMM in speech recognition, an HMM pattern is first generated for each word to be recognized, i.e. for each reference word. The HMM patterns are stored in the memory of the speech recognizer. After the speech recognizer receives the speech pattern, an observation probability is computed for each HMM pattern stored in the memory, and as the result of the recognition process, a word is provided for the HMM pattern for which the highest observation probability is obtained. In other words, such probability is computed for each reference word with which it would be the word uttered by the user. The highest observation probability mentioned above describes the equality of the speech pattern received and the closest HMM pattern, i.e. the closest reference speech pattern.

Thus, in current systems the speech recognizer computes a certain number for the reference words on the basis of the word uttered by a user; in the DTW system the number is the distance between words, and in the HMM method the number indicates a probability of the equality of the words. When using the HMM method, a given threshold probability is usually defined for the speech recognizers which the most probable reference word has to reach in order to make a recognition resolution. Another factor affecting the recognition resolution could be e.g. a difference between the probabilities of the most probable word and the second most probable word; it is expected to be great enough so that a recognition resolution can be made. When a recognition resolution is being made on the basis of the recognition probability of the most probable word, the erring probability is allowed to be at most e.g. 0.1. It Is therefore possible that when the background noise is great, for a reference word in the memory, such as reference word "one", the greatest probability is obtained in every attempt on the basis of a command uttered by the user to be e.g. a 0.8 probability compared with the other reference words. Since the probability remains below the threshold probability 0.9, this is not accepted and the user may have to utter the command several times before exceeding the recognition probability limit, and the speech recognizer accepts the command although the probability may have been very close to the accepted value. From the point of view of the user, this is most disturbing. A correct recognition result can be achieved with a first attempt using the present technique quite often when the speed of the car is below 80 to 90 km per hour depending on the sound insulation of the car and the user's manner of speaking. At higher speeds the performance of the recognizer, however, reduces very abruptly, and in most cars the speech recognizer no longer operates sufficiently reliably at speeds over 100 km per hour to be regarded useful. It is particularly at said speeds at which the need to increase the safety in the traffic is greater than at lower speeds.

SUMMARY OF THE INVENTION

In accordance with a first aspect of the invention there is provided Speech recognition apparatus comprising, comparing means for comparing a first word uttered by a user with an at least one predetermined reference word, calculating means for calculating a value corresponding to the similarity between the first word uttered by the user and the at least one predetermined reference word, and selecting means for selecting said value in accordance with a predetermined criterion, wherein the calculating means is capable of utilising said value in calculating a new value corresponding to the similarity between a second word uttered by the user and the at least one reference word.

In accordance with a second aspect of the invention there is provided a speech recognition method comprising, comparing a first word uttered by a user with an at least one predetermined reference word, calculating a value corresponding to the similarity between the first word uttered by the user and the at least one predetermined reference word, and selecting said value in accordance with a predetermined criterion, wherein said value is used to calculate a new value corresponding to the similarity between a second word uttered by the user and the at least one reference word.

The first and second aspect of the invention have the advantage that a more reliable recognition of words is possible, even if the similarity between uttered words and reference words is not high.

In accordance with a third aspect of the invention there is provided speech recognition apparatus comprising, comparing means for comparing a first word uttered by a user with predetermined reference words, calculating means for calculating values corresponding to the similarity between the first word uttered by the user and respective predetermined reference words, and selecting means for selecting one of said values in accordance with a predetermined criterion, wherein the calculating means is capable of utilising a selected value in calculating new values corresponding to the similarity between a repeated utterance by the user of said first word and the reference words, and the predetermined criterion is that the difference between a highest value and a next highest value exceeds a predetermined threshold value.

In accordance with the fourth aspect of the invention there is provided a speech recognition method comprising, comparing a first word uttered by a user with predetermined reference words, calculating values corresponding to the similarity between the first word uttered by the user and respective predetermined reference words, and selecting said value in accordance with a predetermined criterion, wherein a selected value is used to calculate new values corresponding to the similarity between a repeated utterance by the user of said first word and the predetermined reference words and the predetermined criterion is that the difference between a highest value and a next highest value exceeds a predetermined threshold value.

The third and fourth aspects of the invention have the advantage that more than one voice controlled function can be utilised in apparatus comprising the invention. This has the advantage that further utterances and calculations are necessary only when an uttered word cannot be reliably recognised, or when an uttered word is similar to two different reference words.

In a preferred embodiment of the first and second aspects of the invention, the second word uttered by the user is the same as the first word uttered by the user. This has the advantage that a second calculation is only performed when the second uttered word is the same as the first uttered word, thereby avoiding unnecessary delay in recognising uttered words.

Preferably, the predetermined criterion is that said value is less than a predetermined threshold value. This has the advantage that further utterances and calculations are necessary only when an uttered word cannot be reliably recognised, or when an uttered word is similar to two different reference words.

Suitably, repetition of the first word uttered by the user is requested when said value does not fulfil said predetermined criterion which clearly indicates to the user that an uttered word has not been recognised and that it is necessary for the user to repeat the word.

In the method of the invention, a speech recognizer computes the recognition probabilities for reference words and makes a recognition resolution if one of the probabilities exceeds a predetermined threshold value; otherwise, the user is requested to utter the word again and a recognition resolution is made thereon if the probability of one of the reference words exceeds a predetermined threshold value: otherwise, a new probability is computed utilizing the prevailing probability computed by the speech recognizer, and a probability computed in one or more preceding times, on the condition that they are probabilities of one and the same reference word, and that a recognition resolution is made if said probability exceeds a predetermined threshold value. Unless the predetermined threshold value is exceeded by the probability computed by the speech recognizer, the computed probability is stored in the memory, the user is requested to utter the word once again, and the value stored in the memory Is used together with the subsequent probability / probabilities computed for the same word by the speech recognizer, in order to compute a new probability to be computed on the basis of said probabilities (for making a recognition resolution if, taking in consideration the preceding probabilities, a threshold probability is achieved). Thereafter, when the speech recognizer computes a probability exceeding the threshold value, or it is reached by taking in consideration the preceding probabilities, the memory is reset. Also in the instance in which a repetition of a previous word is in question, the memory is reset prior to a recognition resolution. The memory is reset also when the power is switched on in the apparatus and if an operation is interrupted.

DETAILED DESCRIPTION OF EMBODIMENTS OF THE INVENTION

Figure 1:
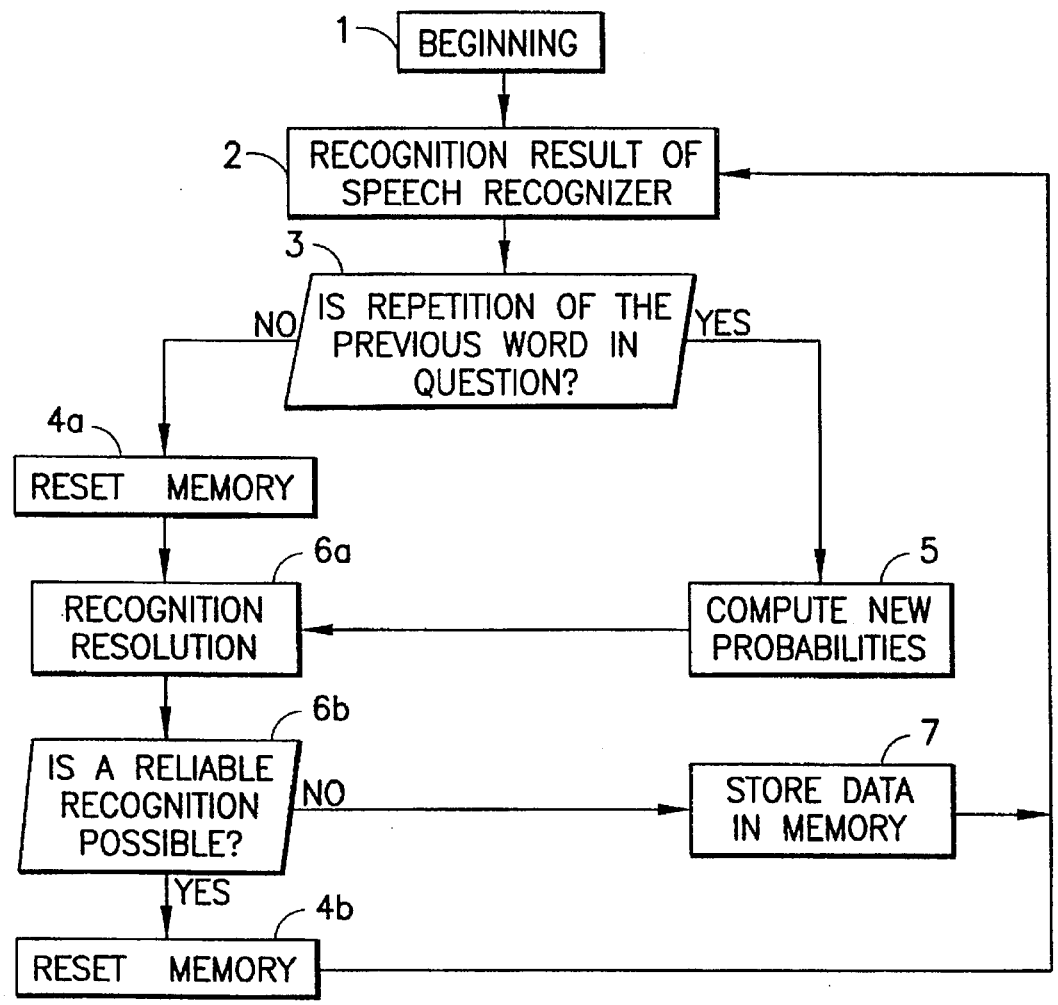
FIG. 1 shows a principle flow diagram of the steps to be taken in the method.

In FIG. 1 the speech recognition method of the invention is clarified. The method is not directly associated with the internal method of the speech recognizer used in speech recognition, but by using the method achieving a recognition resolution is accelerated and the recognition precision is improved without paying attention to the properties of the actual speech recognizer. When the power is switched on in the means at the "beginning" 1 of the process, the memory is reset and an utterance from a user is expected to take place, whereby the speech recognizer computes 2 probabilities for all reference words and, as a result of recognition, it yields the reference word possessing the greatest probability, i.e. the reference word resembling most the word uttered by the user. If the probability of the reference word does not exceed a predetermined threshold value or the threshold value of the probabilities of the most probable and the second most probable word, in the present context called commonly the threshold values of speech recognition, it is found out 3 if the word being examined is a repetition of the preceding word. If repetition of such preceding word is not in question, the memory is reset 4a. When the user has not uttered the word more than once, the memory contains nothing during the first computation round, whereby no new probability is computed, either, but a recognition resolution is made 6a, and if no reliable recognition can be made 6b, a probability computed by the speech recognizer is stored 7 in the memory, and a subsequent utterance from the user is awaited. If, on the other hand, the word is a repetition of the previous word, a new probability is computed 5 making use in the computation of the probability of a preceding recognition attempt stored in the memory, and on the basis thereof, a recognition resolution is made 6a, 6b. If the new probability is obtained by means of the computations 5 exceeds the threshold value, i.e. a reliable recognition can be made 6b, the memory is reset 4b, and a subsequent utterance 2 from the user and a recognition result obtained 2 from the speech recognizer are expected to take place, etc. If the new probability is below the threshold value, so that no reliable recognition can be made, said new probability is stored in the memory 7, and a subsequent utterance 2 of the user is expected to take place, etc. If one of the functions is interrupted, the memory is reset, so that nothing that would distort a new recognition to be started after the interruption remains there. The method according to the invention may also be implemented so that the recognition resolution 6a, 6b is made before finding out 3 whether a repetition of the preceding word is in question or not. Now, if the value computed by the speech recognizer for the repeated word exceeds the set threshold value, no such computation of a new probability needs to be done in which the values computed in preceding recognition attempts are taken into account.

For carrying out the computation process, several computation procedures can be developed, by using which a more appropriate probability can be provided through the use of the preceding probability in such computations. However, the most useful formula is the computation formula for conditional probability. For demonstrating the computation procedure used in the method, the utilisation of conditional probability computation is described below in detail and in conjunction with the method of the invention. Such a computation is examined for a situation in which a user utters first a word A and then word B after the user has been requested by the system to repeat that word. A speech recognizer computes e.g. the following probabilities for both words A and B:

P(A=1)=0.7 (probability that A was "one")
P(A=2)=0.3 (probability that A was "two")
P(B=1)=0.8 (probability that B was "one")
P(B=2)=0.2 (probability that B was "two")

If 0.9 has been set for the threshold value of the recognition resolution, no recognition resolution can be made concerning either recognition. When we know that the user uttered the same word both times, the reliability of the recognition can be increased by utilizing the probability computed by one Or more of the preceding and present recognitions in order to compute a new probability. This can be done e.g. with a conditional probability computation as follows:

$$P(B=1/A=B) = \frac{P(B=1 \text{ and } A=B)}{P(A=B)} =$$

$$= \frac{P(B=1 \text{ and } ((A=1 \text{ and } B=1) \text{ or } (A=2 \text{ and } B=2)))}{P(A=B)} =$$

$$\frac{P((A=1 \text{ and } B=1) \text{ or } (B=1 \text{ and } A=2 \text{ and } B=2))}{P(A=B)} =$$

$$\frac{P(A=1 \text{ and } B=1)}{P((A=1 \text{ and } B=1) \text{ or } (A=2 \text{ and } B=2))} =$$

$$\frac{0.7*0.8}{0.7*0.8+0.3*0.2} = \frac{0.56}{0.62} = 0.903$$

The above computation in which a probability was computed for the particular that the second word, i.e. B, is "one" on the condition that A is equal to B, in other words, the first word is the same as the second one, leads to a new probability which in the present case exceeds the threshold value, and a recognition resolution can be made. Even if the new probability did not exceed the threshold value, it is, however, better than the individual probability computed by the speech recognizer, and in this manner said new probability is stored in the memory and used in calculating a subsequent new probability together with a subsequent probability computed by the speech recognizer. It is also found that the difference with the second most probable word increases. The above formula can be simplified by using only the numerator instead of the denominator and multiplied with an appropriate constant Y:

$$P(B=x|A=B)=Y*P(A=x \text{ and } B=x)=Y*P(A=x)*P(B=x)$$

Thus, if the user utters a word N times, the total probability of each reference word r is obtained as follows:

$$P(r)=Y*P(r,2)* \ldots P(r,N)$$

where P(r, 1) is the first utterance of reference word r, P(r,2) is the second and N is the last utterance thereof. In the above example a probability for a given reference word was computed. In conformance with the threshold criteria of speech recognition, the difference of the probabilities of two reference words (of the reference word which obtained the highest probability and the second highest probability from the speech recognizer), automatically increases and therefore the recognition reliability is improved. It is simple to use the above methods of computation when the HMM method is used in the speech recognizer because in such instances it computes for each reference word the probability of the word uttered by the user. When using the DTW method, the computation is not quite so straightforward because now a probability is not computed for reference words in the speech recognizer, but a distance or a standard of how far the uttered word is from each reference word.

Therefore, in order to improve the recognition reliability according to the method of making use of prior probabilities, the standard or distance has first to be transformed into a probability. In DTW it is thus possible to describe with a number D(r,i) to what extent each reference word r resembles an uttered word in a repeated time i. Hereby, a probability can be computed from the number with the aid of a function f(), e.g. a non-linear function, as follows:

$$D(r)=f(D(r,1),D(r,2), \ldots ,D(r,N))$$

Alternatively an estimate of the probability of a reference word from the result yielded by a DTW algorithm by means of an estimate g(), whereby the result computed by the speech recognizer can be converted into a probability and the probability of an i:nth repetition of reference word r is now $P(r,i)=g(D(r,i))$ whereby the number $P(r,i)$, can be used according to the method in calculating a new probability as described above.

Figure 2:
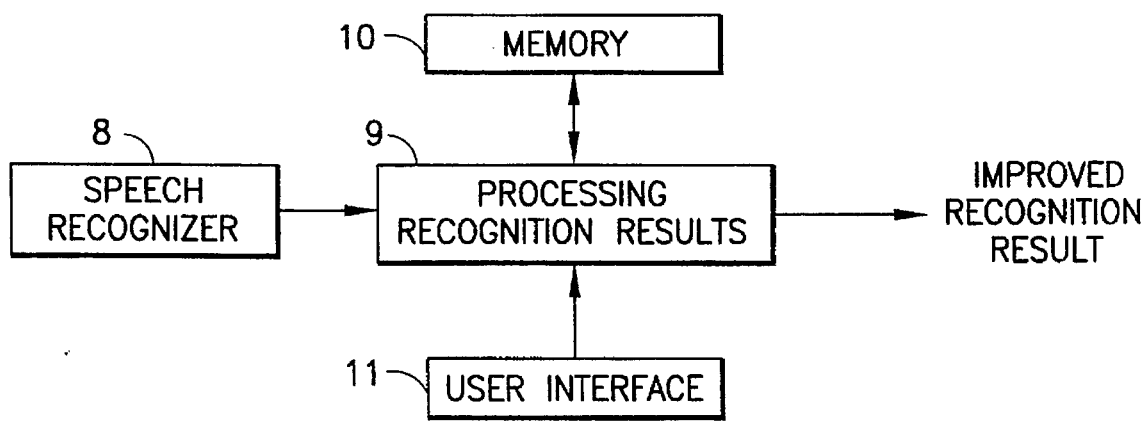
FIG. 2 shows a block diagram for implementing the method in a system in which speech recognition is used.

One way of implementing the method of the invention in the speech recognition system is shown in FIG. 2. With the method, the recognition accuracy of the speech recognition system can be improved in which the speech recognizer 8 provides recognition results, i.e. recognition probabilities, which are fed to the recognition results processing unit 9. Each recognition results contains a list of the words to be recognized, for each of which a probability (or other quality factor) has been computed, describing to what extent a word uttered by the user bears resemblance to each reference word. The reference words may have been stored in advance in the internal reference word memory of the speech recognizer 8 or the speech recognizer has been made able to "learn" words uttered by the user. However, this detail has no bearing from the point of view of the invention on how and when the reference words have been stored in the reference word memory, and the speech recognizer 8 need not have a reference word memory. If a word cannot be recognized at a sufficient reliability, the user communications device 11 requests the user to repeat the word. In such instance, the user communications device 11 gives information to the processing block 9, of the recognition results on whether a word is going to be repeated by the user or not. When the user communications device 11 informs the processing unit 9 that a repetition of a word is to be expected, the data stored in conjunction with the preceding recognition attempt are accessed from the memory 10, and new probabilities are computed for the reference words in a manner regarding the preceding values according to the invention. If no sufficiently reliable recognition can be made, even based on the new probabilities, said new, higher calculated probabilities are nevertheless stored in the memory 10. After a successful recognition has been made, the memory 10 is reset. The memory is also reset when data is sent to the processing block 9 from the user communications device 11 that the next word to enter is not the same as the previous one. In practice, the system may be such that the processing block 9, the memory 10 and the user communications block 11 form part of the same processor, i.e. they are realized with the aid of a processor. The processor can be one arranged particularly for the speech recognition system or it may be the main processor for a radiophone. Typically, also the speech recognizer 8 comprises a signal processor.

With the aid of the present invention, the speech recognition accuracy can be improved although the basic performance of the speech recognizer itself is not improved. When the recognition accuracy is improved, the decision making concerning recognition is accelerated and a more user friendly hands free phone can be implemented. The present invention is not limited to the formula of the example shown in FIG. 1 but various functions may also be performed in a different order.

In view of the foregoing description it will be evident to a person skilled in the art that various modifications may be made within the scope of the invention.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during the prosecution of this application or of any such further application derived therefrom.

I claim:

1. Speech recognition apparatus, comprising:

word recognition means operative during a word recognition mode of operation for comparing a first word uttered by a user with a predetermined reference word and for outputting a respective first value that indicates an amount of similarity between the first word uttered by the user and a respective predetermined reference word;

processing means having an input coupled to an output of said word recognition means for receiving a respective first value that is outputted by said word recognition means in response to said first word uttered by the user;

memory means coupled to said processing means, said processing means being responsive for storing the respective first value in said memory means upon an occurrence of a condition such that a respective first value is less than a predetermined threshold value, said processing means determining a revised first value when a respective second value is outputted from said word recognition means in response to the user uttering a second word, the revised first value being determined from the respective second value and from the stored respective first value, said revised first value indicating an amount of similarity between the second word uttered by the user and the respective predetermined reference word that is associated with said revised first value; and indicator means responsive to a condition such that a respective or revised value is equal to or greater than a predetermined threshold value, for indicating that said second word uttered by the user corresponds to the respective predetermined reference word.

2. Speech recognition apparatus as set forth in claim 1 wherein said processing means further includes:

means responsive for storing the revised first value in said memory means upon an occurrence of a condition such that the revised first value is less than the predetermined threshold value, said processing means further determining a second revised first value when a respective third value is outputted from said word recognition means in response to the user uttering a third word, the second revised value being determined from the respective third value and from the stored revised value, said second revised value indicating an amount of similarity between the third word uttered by the user and the respective predetermined reference word that is associated with said stored revised value, said indicator means being further responsive to a condition such that a second revised value is equal to or greater than the predetermined threshold value, for indicating that the third word uttered by the user corresponds to the respective predetermined reference word.

3. Speech recognition apparatus as set forth in claim 2, wherein said processing means further includes:

means for determining a conditional probability for use in determining the stored revised value and the second revised value.

4. Speech recognition apparatus as set forth in claim 1 wherein said word recognition means has an input coupled to an output of a speech transducer that is located within a vehicle.

5. Speech recognition apparatus, comprising:

word recognition means operative during a word recognition mode of operation for comparing a first word uttered by a user with a plurality of predetermined reference words and for outputting a plurality of respective first probability values individual ones of which indicate an amount of similarity between the first word uttered by the user and a respective one of said plurality of predetermined reference words;

processing means having an input coupled to an output of said word recognition means for receiving a plurality of respective first probability values that are outputted by said word recognition means in response to said first word uttered by the user, said processing means including means for obtaining differences between the respective first probability values and responsive to a condition such that a difference between (a) a first respective first probability value of said plurality of respective first probability values that has the highest value and (b) a second respective first probability value of said plurality of respective first probability values that has the second highest value, is less than a predetermined threshold value, for storing said first and second respective first probability values;

memory means coupled to said processing means, said processing means being responsive for storing the first respective first probability value and the second respective first probability value in said memory means upon the occurrence of said condition, said processing means determining a revised first respective first probability value and a revised second respective first probability value when a second plurality of respective second probability values are outputted from said word recognition means in response to the user uttering a second word, the revised first respective first probability value and the revised second respective first probability value being determined from the second plurality of respective second probability values and from the stored first and second respective first probability values; and indicator means responsive to a condition such that a difference between the revised first respective probability value and the revised second respective probability value or a first respective probability value and a second respective probability value is equal to or greater than the predetermined threshold value, for indicating that said second word uttered by the user corresponds to a respective one of said plurality of predetermined reference words that has the highest respective or revised probability value associated therewith.

6. Speech recognition apparatus as set forth in claim 5 wherein said processing means further includes:

means for determining a conditional probability for use in determining the revised respective first probability values.

7. Speech recognition apparatus as set forth in claim 5 wherein said processing means further includes:

means for determining a conditional probability for use in determining the revised respective first probability values.

8. Speech recognition apparatus, comprising:

word recognition means operative during a word recognition mode of operation for comparing a word uttered by a user with a plurality of predetermined reference words and for outputting a plurality of respective first values respective ones of which indicate an amount of similarity between the first word uttered by the user and a respective one of said plurality of predetermined reference words;

processing means having an input coupled to an output of said word recognition means for receiving a plurality of respective first values that are outputted by said word recognition means in response to a first word uttered by the user, said processing means including means for transforming said plurality of respective first values into a corresponding plurality of respective first probability values, said processing means including means for obtaining differences between the respective first probability values and responding to a condition such that a difference between (a) a first respective first probability value of said plurality of respective first proability values that has the highest value and (b) a second respective first probability value of said plurality of respective first probability values that has the second highest value, is less than a predetermined threshold value, for storing said first and second respective first probability values;

memory means coupled to said processing means, said processing means being responsive for storing the first respective first probability value and the second respective first probability value in said memory means upon the occurrence of said condition, said transforming means also transforming a second plurality of respective second values outputted from said Word recognition means in response to the user uttering a second word into a corresponding second plurality of respective second probability values, said processing means determining a revised first respective first probability value and a revised second respective first probability value from the plurality of respective second probability values and the stored first and second respective first probability values, in response to the user uttering the same word a second time; and means responsive to a condition such that a difference between the revised first respective first probability value and the revised second respective first probability value is equal to or greater than a predetermined threshold value, for indicating that said second word uttered by the user corresponds to a respective one of said plurality of predetermined reference words that has the highest respective or revised first probability value associated therewith.

9. Speech recognition apparatus as set forth in claim 8 wherein said processing means further includes:

means for use in determining a conditional probability for determining the revised respective first probability values.

10. Speech recognition apparatus as set forth in claim 8 wherein said word recognition means has an input coupled to an output of a speech transducer that is located within a vehicle.

11. A speech recognition method, comprising the steps of:

during a word recognition mode of operation;

comparing a first word uttered by a user with a plurality of predetermined reference words and outputting a respective first value that indicates an amount of similarity between the first word uttered by the user and a respective one of said plurality of predetermined reference words;

responding to a condition such that a first respective value is less than a predetermined threshold value, by storing the first value in a memory means;

responding to a respective second value outputted in response to the user uttering a second word, by determining a revised first value, from the respective second value and from the stored respective first value, said revised first value indicating an amount of similarity between the second word uttered by the user and the respective one of said plurality of predetermined reference words that is associated with said revised first value; and responding to a condition such that the revised first value is equal to or greater than a predetermined threshold value, by indicating that the second word uttered by the user corresponds to the respective one of said plurality of predetermined reference words.

12. A method as set forth in claim 11 and further including the steps of:

responding to a condition such that the revised first value is less than the predetermined threshold value, by storing the revised first value in the memory means;

responding to a third respective value outputted in response to the user uttering a third word, by determining a second revised first value, from the third respective value and the stored revised first value, said second revised first value indicating an amount of similarity between the third word uttered by the user and the one of said plurality of predetermined reference words that is associated with said stored revised value, and;

responding to a condition such that the second revised first value is equal to or greater than a predetermined threshold value, by indicating that the third word uttered by the user corresponds to the respective one of said plurality of predetermined reference words.

13. A method as set forth in claim 12 wherein the step of determining a first revised first value and the step of determining a second revised first value each include a step of determining a conditional probability.

14. A method as set forth in claim 11 wherein the step of comparing includes a step of inputting a signal from an output of a speech transducer that is located within a vehicle.

15. A speech recognition method, comprising the steps of:

during a word recognition mode of operation;

comparing a first word uttered by a user with a plurality of predetermined reference words and outputting a plurality of respective first probability values individual ones of which indicate an amount of similarity between the first word uttered by the user and a respective one of said plurality of predetermined reference words;

responding to a condition such that a difference between (a) a first respective first probability value of one of the plurality of respective first probability values that has the highest value and (b) a second respective first probability value of said plurality of respective first probability values that has the second highest value, is less than a predetermined threshold value, by storing at least the first respective first probability value and the second respective first probability value in a memory means;

responding to a plurality of respective second probability values outputted in response to the user uttering a second word, by determining a revised first respective first probability value and a revised second respective first probability value from the plurality of respective second probability values and the stored first and second respective first probability values; and responding to a condition such that a difference between the revised first respective first probability value and the revised second respective first probability value is equal to or greater than a predetermined threshold value, for indicating that the second word uttered by the user corresponds to a respective one of said plurality of predetermined reference words that has the highest revised first probability value associated therewith.

16. A method as set forth in claim 15 wherein the step of determining a revised first respective first probability value and a revised second respective first probability value includes a further step of determining a conditional probability.

17. A method as set forth in claim 15 wherein the step of comparing includes a step of inputting a signal from an output of a speech transducer that is located within a vehicle.

18. A speech recognition method, comprising the steps of:

during a word recognition mode of operation;

comparing a first word uttered by a user with a plurality of predetermined reference words and outputting a plurality of respective first values respective ones of which indicate an amount of similarity between the first word uttered by the user and a respective one of said plurality of predetermined reference words;

transforming said plurality of respective first values into a corresponding plurality of respective first probability values;

responding to a condition such that a difference between (a) a first respective first probability value of said plurality of respective first probability values that has the highest value and (b) a second respective first probability value of said plurality of respective first probability values that has the second highest value, is less than a predetermined threshold value, by storing said first and second respective probability values in a memory means;

responding to a plurality of respective second values outputted from the word recognition means in response to the user uttering a second word, by transforming the plurality of respective second values into a corresponding plurality of respective second probability values;

determining a revised first respective first probability value and a revised second respective first probability value from the plurality of respective second probability values and the stored first and second respective first probability values; and responding to a condition such that a difference between the revised first respective first probability value and the revised second respective first probability value is equal to or greater than a predetermined threshold value, by indicating that said second word uttered by the user corresponds to a respective one of said plurality of predetermined reference words that has the highest respective or revised probability values associated therewith.

19. A method as set forth in claim 18 wherein the step of determining a revised first respective first probability value and a revised second respective first probability value further includes a step of determining a conditional probability.

20. The method as set forth in claim 18 wherein the step of determining a revised first respective first probability value and a revised second respective first probability value further includes a step of determining a conditional probability.

21. A hands-free radiotelephone, comprising:

word recognition means having an input coupled to an output of a speech transducer that is located within a vehicle, said word recognition means being operative during a word recognition mode of operation for comparing a first word uttered by a user with a plurality of predetermined reference words and for outputting a respective first value that indicates an amount of similarity between the first word uttered by the user and a respective one of said plurality of predetermined reference words;

processing means having an input coupled to an output of said word recognition means for receiving a respective first value that is outputted by said word recognition means in response to said first word uttered by the user;

memory means coupled to said processing means, said processing means being responsive for storing the respective first value in said memory means upon an occurrence of a condition such that a respective first value is less than a predetermined threshold value;

means responsive to said condition for requesting the user to repeat the first word, said recognition means outputting a respective second value in response to the user uttering said word, said processing means determining at least one revised first value from said respective second value and said stored respective first value, the revised first value indicating an amount of similarity between the first word uttered by the user, the second word uttered by the user, and a respective one of said plurality of predetermined reference words word selection means responsive to a condition such that a revised first value is equal to or greater than the predetermined threshold value, for selecting a respective one of said plurality of predetermined reference words as an input to a user-controlled function of said radiotelephone.

22. A method for dialing a telephone number with a hands-free radiotelephone, comprising the steps of:

during a word recognition mode of operation of a speech recognition system;

responding to a user vocalizing a number between 0 and 9, by performing a word recognition function to determine a respective first probability value that the vocalized number is a respective first number between 0 and 9;

if the respective first probability value is equal to or greater than a predetermined threshold value, identifying said respective first number between 0 and 9 as the number vocalized by the user and using the identified number as a part of the telephone number to be dialed;

if the respective first probability value is less than the threshold value, storing the respective first probability value, and instructing the user to vocalize the same number a second time;

responding to the user re-vocalizing the number between 0 and 9, by performing the word recognition function to determine a respective second probability value indicating the amount by which the re-vocalized number is similar to a respective second number between 0 and 9;

if the respective second probability value is equal to or greater than the threshold value, identifying said respective second number between 0 and 9 as the number vocalized by the user the second time and using the identified number as a part of the telephone number to be dialed;

if the respective second probability value is less than the predetermined threshold value, calculating a revised first probability value from the stored first probability value and the second respective probability value;

if the revised first probability value is less than the threshold value, storing the revised first probability value, and instructing the user to vocalize the same number a third time; and if the revised first probability value is equal to or greater than the threshold value, identifying a number between 0 and 9 as the number vocalized by the user and using the identified number as a part of the telephone number to be dialed.

* * * * *